S. S. BENNETT.
GEARING FOR MOTOR VEHICLES.
APPLICATION FILED JUNE 23, 1909.
1,014,036.
Patented Jan. 9, 1912.
2 SHEETS—SHEET 1.
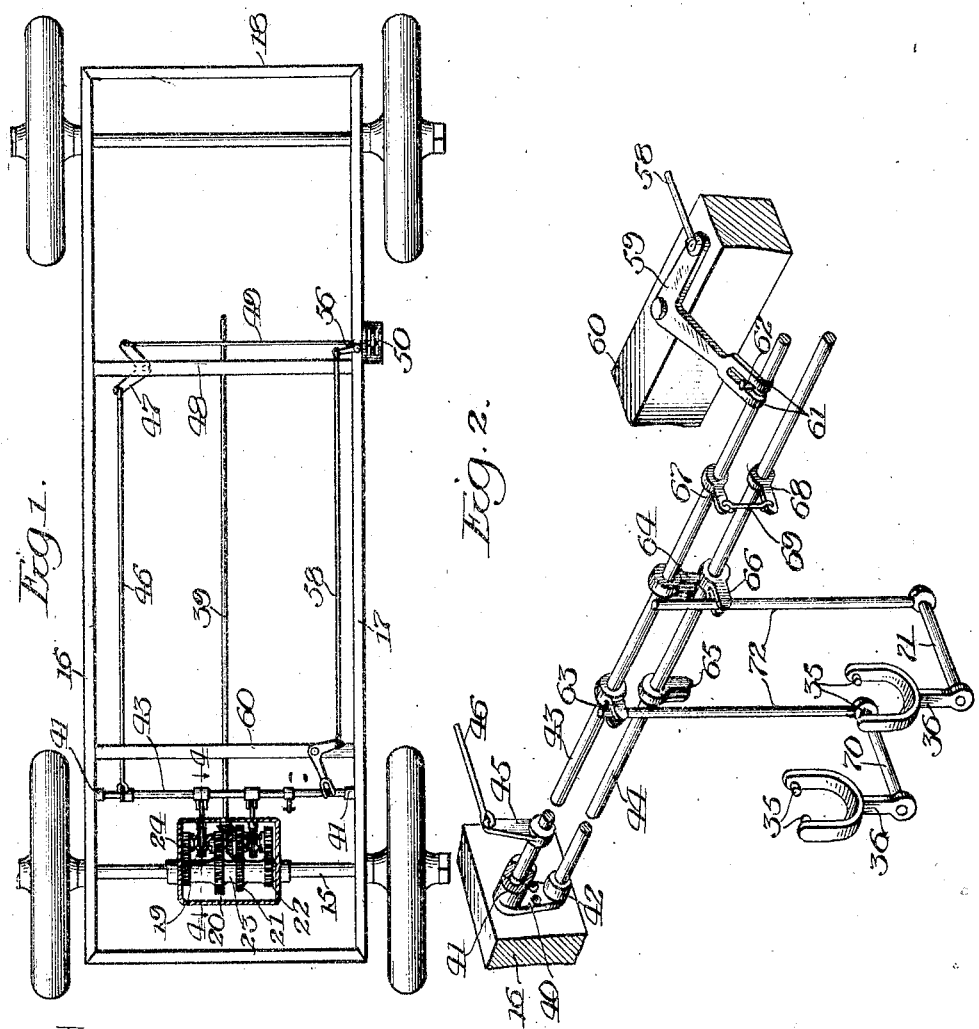
Witnesses
O. W. Vermick
J. E. Hanson.
Inventor
Stephen S. Bennett.
by Chas. C. Tillman
Atty S. S. BENNETT.
GEARING FOR MOTOR VEHICLES.
APPLICATION FILED JUNE 23, 1909.
1,014,036.
Patented Jan. 9, 1912.
2 SHEETS—SHEET 2.
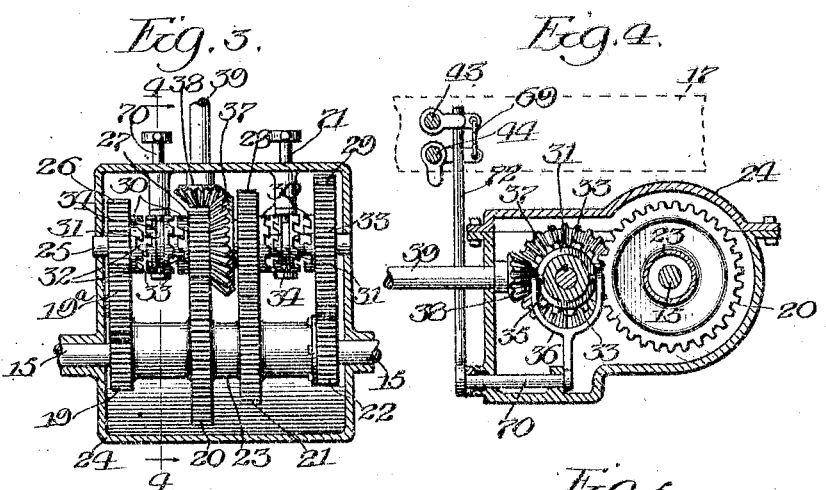
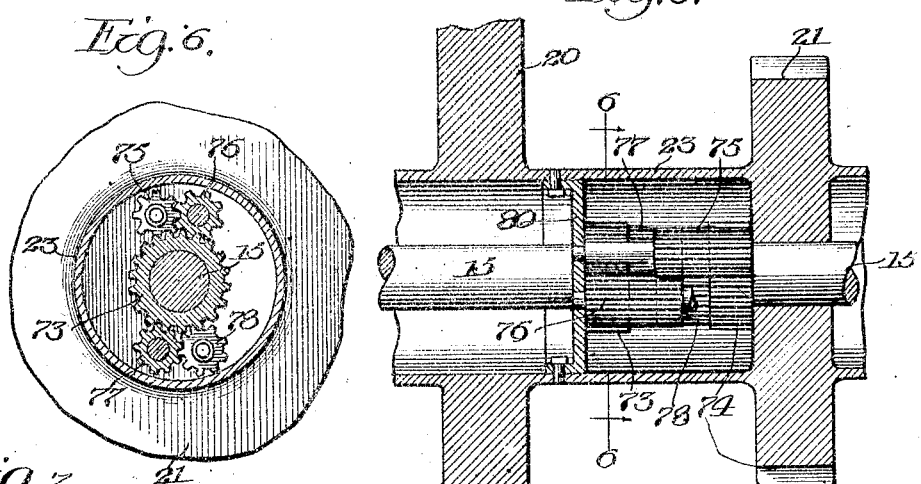
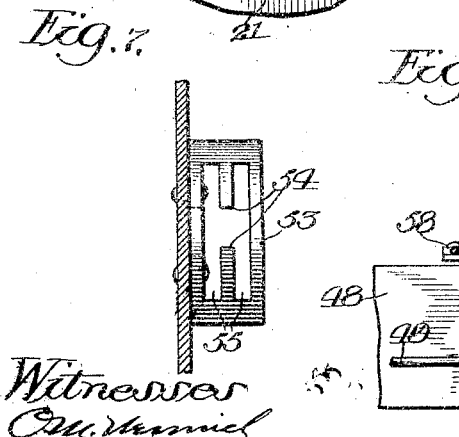
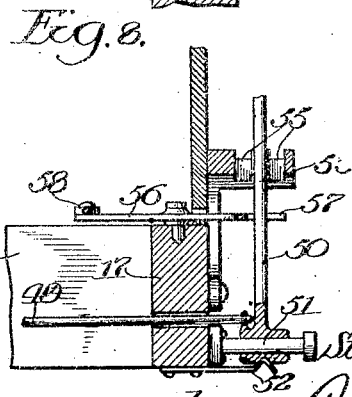
Witnesses
Inventor
Stephen S. Bennett

UNITED STATES PATENT OFFICE.

STEPHEN S. BENNETT, OF CHICAGO, ILLINOIS.

GEARING FOR MOTOR-VEHICLES.

1,014,036.

Specification of Letters Patent. Patented Jan. 9, 1912.

Application filed June 23, 1909. Serial No. 503,809.

*To all whom it may concern:*

Be it known that I, STEPHEN S. BENNETT, residing at Chicago, in the county of Cook and State of Illinois, have invented certain new and useful Improvements in Gearing for Motor-Vehicles and Means for Operating the Same, of which the following is a specification.

This invention relates to improvements in speed-changing mechanism, and differential gears for motor vehicles, such as automobiles, and it consists in certain peculiarities of the construction, arrangement, and operation of the various parts thereof, as will be hereinafter more fully set forth and specifically claimed.

The principal object of the invention is to provide simple and efficient means for changing the speed of the vehicle, as well as to allow the traction wheels on the rear axle of the vehicle to turn at different speeds necessary when the vehicle turns a curve.

Another object of the invention is to provide a mechanism employing positive clutch engaged gearing and of such construction that with one lever, any one of a series of gears may be quickly and positively engaged, and that while so engaged, all the other clutch-faces will be positively held disengaged.

Other objects of the invention will be described in the sub-joined description and explanation.

In order to enable others skilled in the art to which the invention pertains, to make and use the same, I will now proceed to describe it, referring to the accompanying drawings, on which—

Figure 1, is a plan view partly in section, and partly in elevation of the frame of a motor vehicle, such as an automobile, showing my improvements mounted thereon, and the parts thereof in their inoperative or neutral positions. Fig. 2, is a perspective view of a portion of the frame of the vehicle showing a part of the mechanism for operating the clutches which engage the speed-changing gears. Fig. 3, is an enlarged plan sectional view of the casing which incloses the speed-changing or power transmitting gears, the latter being shown in elevation. Fig. 4, is a view partly in section, and partly in elevation taken on the lines 4, 4, of Figs. 1, and 3, looking in the direction indicated by the arrows. Fig. 5, is a greatly enlarged plan sectional view of a part of the rear axle of the vehicle, and a portion of the gearing thereon, showing the differential gears arranged within a casing around said axle. Fig. 6, is a cross-sectional view taken on lines 6, 6, of Fig. 5, looking in the direction indicated by the arrows. Fig. 7, is a plan view of the gate or guide for the operating lever of the speed-changing mechanism. And Fig. 8, is an enlarged cross-sectional view of a portion of the frame of the vehicle, showing the manner of mounting the operating lever and gate for the same thereon, and illustrating portions of the connections which unite said lever and the speed-changing mechanism.

Like numerals of reference, refer to corresponding parts throughout the different views of the drawings.

Reference numeral 15, designates the rear axle of the vehicle, which axle is preferably formed of two sections, the inner ends of which meet or approximate one another about midway between the sides 16, and 17, of the vehicle frame 18, which may be of the ordinary or any preferred construction, and upon the rear portion of which the sections of the rear axle 15, are transversely journaled. Mounted on the rear axle, at about its middle, are gears 19, 20, 21, and 22, which are of different sizes as is clearly shown in Figs. 1, and 3, of the drawings, and are united together by means of a hub-like casing 23, which incloses the differential gears arranged between the gears 20, and 21, as shown in Fig. 5, of the drawings.

Mounted on the rear axle 15, and surrounding the above named gears is a casing 24, which is extended forwardly of the axle 15, and has transversely journaled thereon, in front of the axle an auxiliary shaft 25, on which a series of gears 26, 27, 28, and 29, are mounted so as to mesh respectively with the gears 19ª, 20, 21, and 22, on the rear axle. The gears 26, and 27, are each provided on their adjacent surfaces with a clutch-face 30, and the gears 28, and 29, are each provided on their adjacent surfaces with a similar clutch-face 30, to engage clutches 31, slidably mounted on the shaft 25, so that they may be thrown into engagement with the clutch-faces of the said gears.

As is clearly shown in Fig. 3, of the drawings, each of the clutch-faces 30, is provided with a series of diagonally disposed recesses 32, to receive diagonally disposed teeth 33, on the surfaces of each of the clutches 31, each of which clutches is provided with a circumferential groove 34, to receive pins or rollers 35, on the upwardly projecting prongs of the yokes 36, to engage and assist in operating the clutches as will be presently explained.

Mounted on the shaft 25, between the gears 27, and 28, is a beveled gear 37, which meshes with the beveled gear 38, mounted on the inner end of the driving shaft 39, which is journaled at its rear portion in the front part of the casing 24, and is extended forwardly and longitudinally of the vehicle frame, and may be connected at its front portion by any suitable means to a motor or engine, not shown.

Secured to each of the sides 16, and 17, of the vehicle frame is a bracket 40, each of which is provided with upper and lower socketed extensions 41, and 42, respectively which extensions are horizontally and inwardly projected as shown in Figs. 1, and 2, of the drawings. Located at its ends in the sockets of the extensions 41, so as to have longitudinal and rotary movement therein, is a shaft 43, and located at its ends in the sockets of the extensions 42, so that it may have rotary movement is another shaft 44, which, as well as the shaft 43, is extended across the frame of the vehicle in front, and slightly above the casing 24, of the gearing. Rigidly secured to the shaft 43, near one of its ends is a crank 45, which has connected to its upper portion a rod 46, which is extended forwardly, and connected at its front end to one arm of a bell-crank-lever 47, which is suitably fulcrumed on the front part of the vehicle frame, and usually below a cross-piece 48, thereof. Connected at one of its ends to the other arm of the bell-crank-lever 47, is a rod 49, the other end of which is extended through an opening in the side 17, of the vehicle frame, and is connected to the lower portion of the operating lever 50, which is fulcrumed and movably mounted on a rod 51, secured to the side 17, near its front end.

As shown in Fig. 8, the lower portion of the lever 50, is pressed by a spring 52, which may engage a recess formed in the lower portion of said lever. Horizontally supported on the side 17, near its front end, is a gate or guide 53, which is provided with a broken partition 54, to form guideways 55, for the operating lever 50, which is extended upwardly through the opening in said gate or guide. Secured on the upper portion of the side 17, below the gate 53, is a rod or bar 56, which has at its outer end an elongated opening 57, to receive the lever 50, and has connected to its other end a rod 58, which is united at its rear end to one arm of a bell-crank-lever 59, which is fulcrumed on a cross-piece 60, of the vehicle frame, and has on its other arm prongs 61, to stride a pin 62, secured on the shaft 43, near the side 17, of the said frame.

Mounted on the shaft 43, and near the middle thereof, are two forked projections 63, and 64, which as shown are disposed at right angles to one another, that is to say, that when the forked projections 63, occupies a horizontal position, the forked projection 64, will occupy a vertical position. Mounted on the shaft 44, below the projections 63, and 64, are forked projections 65, and 66, which are also disposed at right angles with one another. At a suitable point between their ends, the shafts 43, and 44, are provided with projections 67, and 68 respectively, which are connected together by means of a link 69, so that when the upper shaft 43, is rocked, the lower one will also be partially rotated.

Horizontally journaled in the lower portion of the casing 24, and in parallelism with one another are two shafs 70, and 71, on the inner end of each of which is rigidly secured one of the clutch-yokes 36, which engage the clutches 31, as before stated. Rigidly secured on the outer portions of each of the shafts 70, and 71, is an upright rod 72, which are extended upwardly above the shafts 43, and 44, at proper points to be embraced by the forked projections on said shafts as will be clearly understood by referring to Fig. 2, of the drawings.

Mounted on the inner ends of the sections of the axle 15, within the casing 23, and between the gears 20, and 21, are spur-gears 73, and 74, which mesh with pinions 75, 76, 77, and 78, which pinions are journaled above and below the axle 15, on suitable shafts having their bearings in the hub portion of the gear 21, and in a disk 80, secured in the casing 23, around one of the sections of the axle. The pinions 76, and 77, mesh with spur-gear 73, while the pinions 75, and 78, mesh with the spur-gear 74, thus it will be understood that when the casing 23, is rotated, it will drive the axle, while permitting the differential movement thereof, incidental to turning a curve.

From the foregoing and by reference to the drawings, it will be readily understood and clearly seen that when the operating lever 50, is in the position shown in Figs. 1, and 8, of the drawings, the clutches will be out of engagement with the clutch-faced gears, and the connecting parts between said lever, and clutches will occupy neutral positions, but it will be understood that the vertical rods 72, will be firmly held by means of the forked projections on the shafts 43, and 44, so that, by moving the lever 50, outwardly on the fulcrum rod 51, the shaft 43, through its connections 46, 47, and 49, with the lever, will be rocked, thus releasing the forked projection 63, from one of the rods 72, and causing the forked projection 64, thereon to engage the other rod 72, when by moving the lever 50, in the proper direction in one of the guideways 55, therefor of the gate 53, it is apparent that the shaft 44, will be rocked so as to release the forked projection 66, from one of the rods 72, and cause the forked projection 65, to engage the other rod 72, and at the same time the shaft 43, will be moved by means of its connections 56, 58, and 59, with the lever 50, longitudinally, thus shifting one of the clutches into engagement with the clutch-face of the gear, which imparts the desired speed to the rear axle.

In the above named operation, it will be understood that the rod 72, which is engaged by the forked projection 65, will be firmly held so that the clutch which said rod operates will be held out of engagement with the gears between which it is located. By this arrangement of the parts, it is apparent that either one of the clutches may be thrown into engagement with any one of the gears desired, at any time and non-progressively so that the desired speed may be immediately obtained.

Journaled on a stub shaft between the axle 15, and the shaft 25, is a pinion 19ª, which meshes with the gears 19, and 26, and will afford means for reversing the movement of the vehicle.

Having thus fully described my invention what I claim as new and desire to secure by Letters-Patent is—

1. The combination with a shaft, of different sized gears thereon provided with clutch-faces, clutches movable on said shaft into and out of engagement with said clutch-faces, a yoke-shaft journaled near each of the clutches, a yoke on one end and a rod on the other end of each of the yoke-shafts, a suitably fulcrumed operating-lever, a pair of shafts transversely journaled with respect to the rods on the yoke-shafts and connected together, one of said shafts having rotary and longitudinal movement and the other of said shafts having rotary movement, means on said shafts to alternately engage the rods on the yoke-shafts, means uniting the operating-lever and said shafts whereby both of them may be rocked and one of them moved longitudinally.

2. The combination with a shaft, of different sized gears thereon provided with clutch-faces, clutches movable on said shaft into and out of engagement with said clutch-faces, a yoke-shaft journaled near each of the clutches, a clutch-engaging-yoke on one end and a rod on the other end of each of the yoke-shafts, a suitably fulcrumed operating-lever, a pair of shafts transversely journaled with respect to the rods on the yoke shafts and one having rotary and longitudinal movement and the other rotary movement, a plurality of forked projections mounted on each of said shafts and adapted to engage the said rods, the said projections on each shaft being disposed at angles to one another, and means uniting the operating-lever and said shafts whereby they may be partially rotated and one of them moved longitudinally.

STEPHEN S. BENNETT.

Witnesses:
J. E. HANSON,
CHAS. C. TILGHMAN.